(12) United States Patent
Tang et al.

(10) Patent No.: US 8,804,281 B1
(45) Date of Patent: Aug. 12, 2014

(54) PMR WRITE HEAD WITH MODIFIED MAIN POLE SHAPE TO MINIMIZE ADJACENT TRACK INTERFERENCE

(71) Applicant: Headway Technologies, Inc., Milpitas, CA (US)

(72) Inventors: Yuhui Tang, Milpitas, CA (US); Lijie Guan, Cupertino, CA (US); Suping Song, Fremont, CA (US); Yaguang Wei, Pleasanton, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 13/889,084

(22) Filed: May 7, 2013

(51) Int. Cl.
*G11B 5/147* (2006.01)
(52) U.S. Cl.
USPC .................................................. 360/125.09
(58) Field of Classification Search
CPC .......... G11B 5/147; G11B 5/127; G11B 5/58; G11B 5/584
USPC ............. 360/125.09, 125.38, 125.12, 125.06, 360/125.07, 125.08, 125.01, 125.31, 125.1, 360/125.11, 125.13; 29/603.16
See application file for complete search history.

(56) References Cited

U.S. PATENT DOCUMENTS

| 7,616,403 | B2 | 11/2009 | Ho et al. | |
|---|---|---|---|---|
| 8,094,419 | B2 | 1/2012 | Guan | |
| 8,351,154 | B2 | 1/2013 | Etoh et al. | |
| 2005/0041337 | A1* | 2/2005 | Yazawa et al. | 360/126 |
| 2007/0041126 | A1* | 2/2007 | Sasaki et al. | 360/126 |

* cited by examiner

*Primary Examiner* — Allen T Cao
(74) *Attorney, Agent, or Firm* — Saile Ackerman LLC; Stephen B. Ackerman

(57) ABSTRACT

A magnetic writer has a magnetic pole with projections extending laterally and symmetrically from each side. The pole tip of the magnetic pole is positioned at the ABS of the writer where it is surrounded in a mirror-symmetric fashion by side shields that are co-planar with the ABS. The projections can be the ends of a rectangular bar of soft or hard magnetic material, different than the main pole material, passing completely through the main pole and parallel to the ABS or they can be part of the peripheral shape of the main pole without changes to its material structure. In either case, they impart a shape anisotropy to the main pole and dilute the otherwise concentrated magnetic flux emerging from the pole tip that cause flux leakage from the side shields and undesirable adjacent track interference.

34 Claims, 4 Drawing Sheets

PMR WRITE HEAD WITH MODIFIED MAIN POLE SHAPE TO MINIMIZE ADJACENT TRACK INTERFERENCE

BACKGROUND

1. Technical Field

This disclosure relates generally to magnetic devices that write on magnetic media using perpendicular magnetic fields in the recording process. In particular it relates to a pole design that minimizes writing on regions of the medium that are adjacent to the intended track.

2. Description of the Related Art

The track pitch density in disks used in magnetic recording in a hard disk drive (HDD) is basically limited by adjacent track interference (ATI) during the writing process. The cause of ATI is stray fields from the main write pole or from the side shields that surround the main pole on its lateral sides. Although these side shields are intended to confine the fields for improved resolution, it is precisely these shields that contribute to unwanted writing on either side of the intended track and adversely affect the accuracy of the recorded information that is already there. In order to minimize the effects of unwanted recording on adjacent tracks and thereby interfering with what is already recorded there, it is necessary to eliminate these stray side fields to as great a degree as possible. The present disclosure is intended to improve ATI performance by suppressing these stray fields from the main pole and its side shields while not degrading the on-track performance of the writer.

Although the prior art indicates that many attempts have been made to address this important problem, with U.S. Pat. No. 8,351,154 to Etoh et al., U.S. Pat. No. 8,094,419 to Guan and U.S. Pat. No. 7,616,403 to Ho et al. being cited as only three recent examples, none of the teachings in these patents have taken the approach of this disclosure or have achieved the same degree of success.

SUMMARY

It is the object of the present disclosure to provide a main pole and side shield configuration that will greatly suppress adjacent track interference while not degrading the performance of the writer in the on-track direction.

This object will be met by a main magnetic write pole design that includes a bar that extends laterally and symmetrically to both sides of the pole tip. Referring to FIG. 1a, there is shown a schematic horizontal cross-sectional illustration, from an overhead perspective, that illustrates a typical prior-art main pole shape together with its surrounding side shields. The main pole (10) has a generally triangular periphery (15) that diminishes in width to form a narrow pole tip (20). The pole tip emerges at an ABS (air bearing surface) plane (30) of the writer. A pair of side shields (40) also face the ABS and extend laterally and symmetrically away from the pole tip. The side shields are separated from the pole tip by narrow side gaps (50).

The main pole shape of the present disclosure, which will achieve the object set forth above, is illustrated in FIG. 1b. This main pole (10) differs from that in FIG. 1a in that it has a bar-shaped element (60) that extends through the main pole laterally and extends symmetrically beyond the triangular periphery (15) on both sides. For purposes of the detailed description below, we denote the full lateral width of the bar, from one lateral edge to the other, as: Bar_width. We denote the vertical height of the bar, between the two parallel edges that are parallel to the ABS as: Bar_height. We denote the vertical distance (perpendicular to the ABS) between the bar and the ABS as: d_ABS.

The bar-shaped feature can be an actual bar, of a different material than that which forms the pole, that is inserted into the pole so that its ends project laterally outward symmetrically. Alternatively, it can be formed monolithically with the pole itself, by adding lateral projections to the main pole mask, in which case the pole is simply formed with a different shaped periphery than the usual triangular shape.

Due to the shape anisotropy (wider than high) of the bar (60) and its projections, it will also have a magnetic anisotropy along its width direction (the horizontal or lateral direction) when a current activates the writer. During the writing process the magnetization of the main pole body (10) is driven by the applied writing current. The resulting magnetic flux, generated by the collective magnetization alignments in the main pole body due to its triangular shape, will be concentrated at the main pole tip (20) where it emerges at the ABS. Since the two side shields (50) are very close to the pole tip, the magnetic flux emanating from the pole tip will also drive the magnetization of the side shields. It is this magnetization of the side shields that produces the stray fields that create the unwanted ATI when the pole has the shape shown in FIG. 1a. However, with the bar feature (60) of FIG. 1b, which is close to the ABS and the side shields, the magnetic flux is diluted close to the pole tip. Therefore, there is correspondingly less flux leakage produced by the side shields and the reduction of ATI is obtained.

BRIEF DESCRIPTION OF THE DRAWINGS

FIG. 2a is a schematic diagram showing the magnetic field distribution in the plane of the recording medium produced by the prior art pole of FIG. 1a.

FIG. 4a shows the plated bar, FIG. 4b shows the plated pole over the bar.

FIG. 5a shows the plated pole, FIG. 5b shows the plated pole with a trench cut in it for plating the bar.

DETAILED DESCRIPTION

The present disclosure provides a magnetic pole design that, when working together with adjacent side shields in the ABS plane of a writer, will significantly eliminate adjacent track interference (ATI) caused by magnetic field leakage from the side shields. Referring back to FIG. 1b, there is shown, schematically, the presently disclosed pole design, where a bar-shaped element (60), protruding laterally and symmetrically from the periphery of the main pole (15), near to its ABS end (20), reduces the concentration of the main pole magnetization and the flux it produces, where the flux emanates from the pole tip. This reduction in flux concentration then correspondingly reduces flux leakage (stray fields) from the side shields (40), which are quite close to the pole tip precisely in the region of concentrated flux. The bar-shaped element can be an actual bar of material other than the material of the main pole that is incorporated within the main pole. If the bar is such a piece of non-pole material, it may be a bar of soft magnetic material with a different saturated magnetization, $M_s$, than the main pole material, or it may be a bar of hard magnetic material with a specified anisotropy. If the bar-shaped element is formed of the main pole itself, then it may be fabricated by changing the periphery of the mask that defines the pole shape so that the periphery includes mirror-image symmetrical projections formed co-linearly along a horizontal center line.

Typically and most effectively the vertex angle of the main pole is in the range between approximately 30° and 120°. In the example used to create the plots of the following figures, the vertex angle is approximately 60°.

Figure 1A:
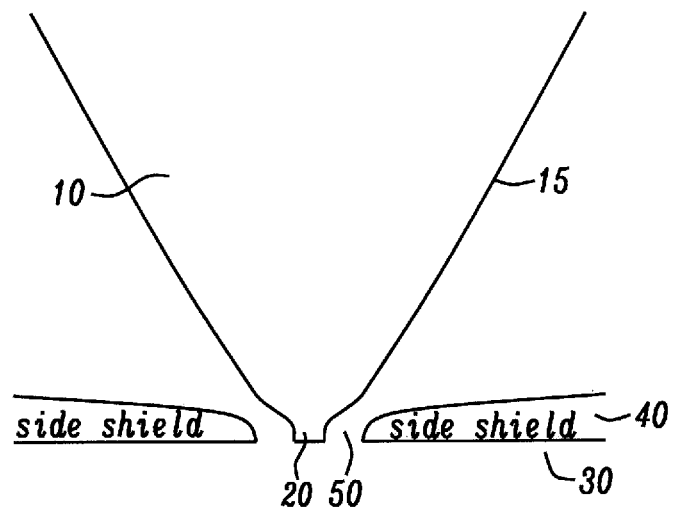
FIG. 1a is a schematic overhead view, in a horizontal cross-sectional plane, of a prior art main pole whose pole tip is surrounded by side shields at the ABS.
Figure 2A:
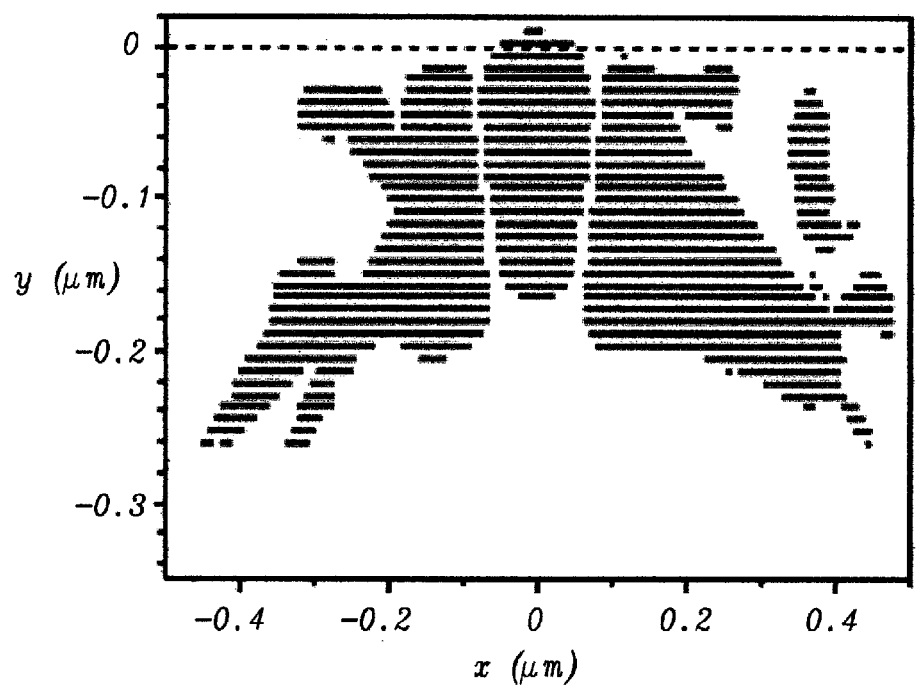

Referring to FIG. 2a, there is shown a diagram of the footprint of the magnetic field in the surface plane of the magnetic recording medium of the prior-art main pole of FIG. 1a. The horizontal O-line is the ABS of the writer. The x-axis measures distance (in microns) to the left and right of the center track (x=0). The y-axis measures distance (in microns) away from the ABS along the track being written on.

Figure 2B:
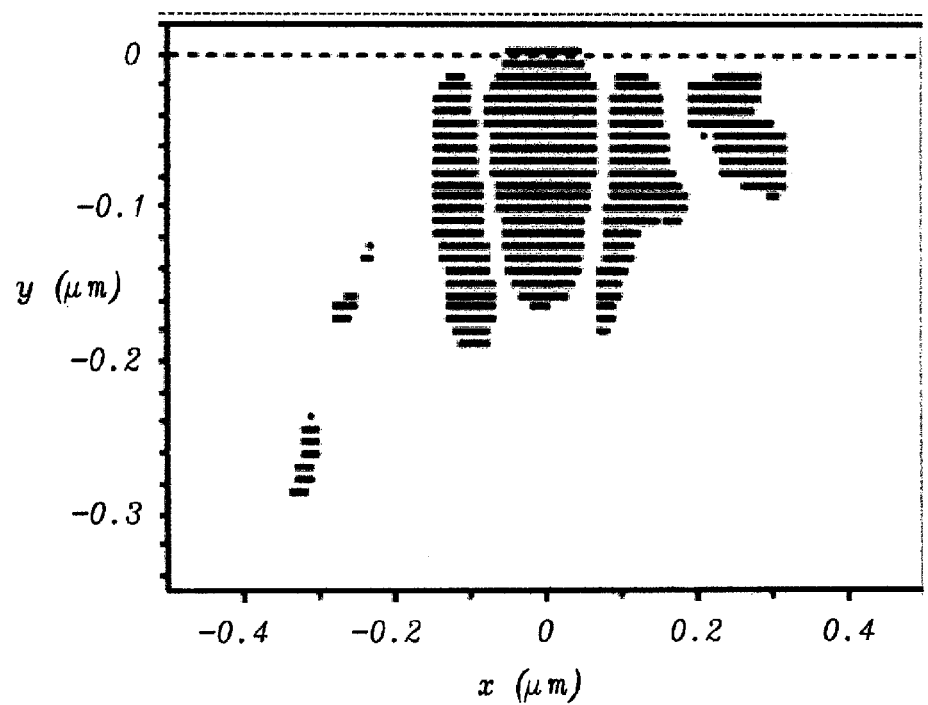
FIG. 2b is a schematic diagram showing the magnetic field distribution in the plane of the recording medium produced by the presently disclosed pole of FIG. 1b.

Referring to FIG. 2b, there is shown a diagram of the footprint of the magnetic field in the surface plane of the magnetic recording medium of the presently disclosed main pole. The horizontal O-line is the ABS of the writer. The x-axis measures distance (in microns) to the left and right of the center track (x=0). The y-axis measures distance (in microns) away from the ABS along the track being written on. The significant reduction of field intensity to either side of the track being written on is clearly seen. It can also be seen that the magnetic field along the track being written on is substantially identical in both cases, so eliminating stray fields along the sides (off-track) does not come at the expense of the field required for writing on-track.

Figure 1B:
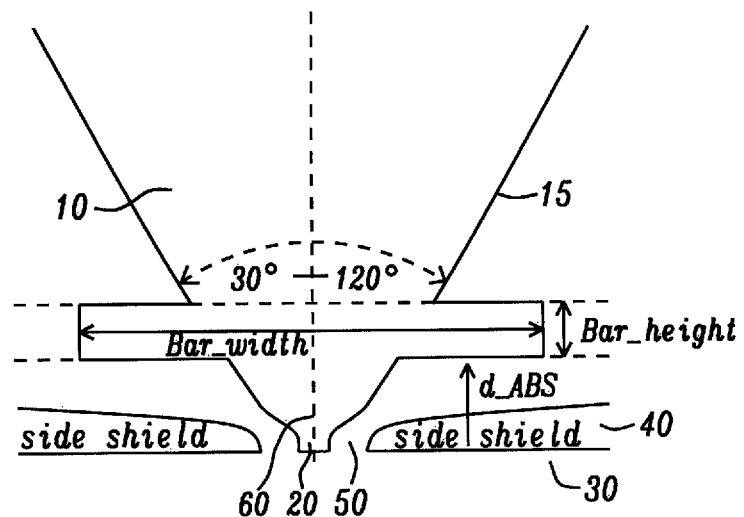
FIG. 1b is a schematic overhead view, in a horizontal cross-sectional plane, of the presently disclosed main pole, having a horizontally projecting bar-shaped feature, whose pole tip is surrounded by side shields at the ABS.
Figure 3A:
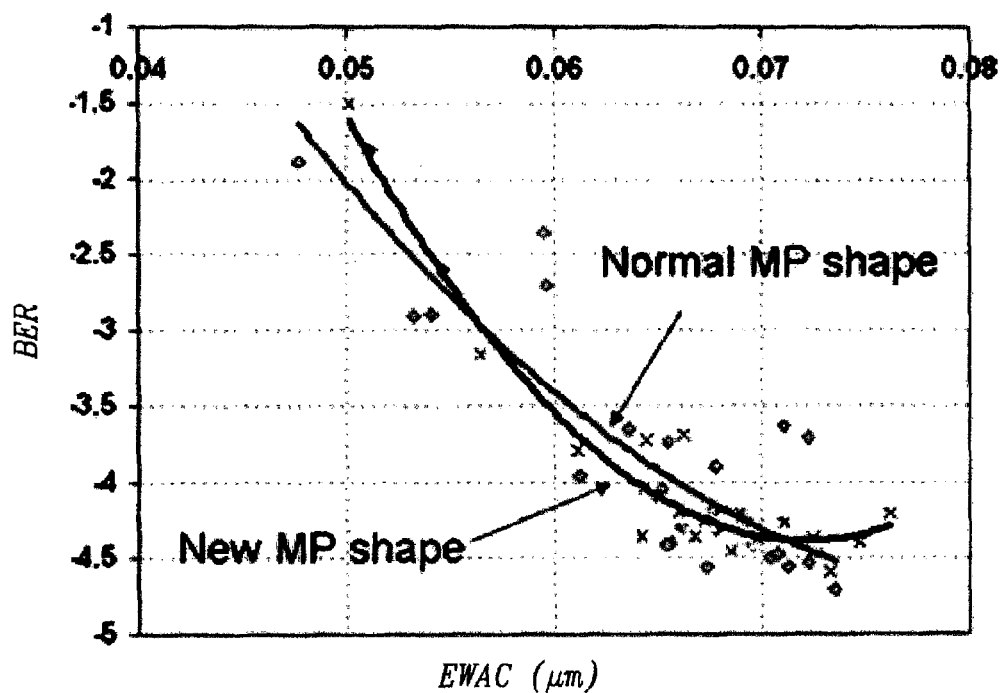
FIG. 3a is a graphical illustration of the on-track performance of a prior art writer with the pole design shown in FIG. 1a, compared to the on-track performance, under identical circumstances, of the presently disclosed pole design of FIG. 1b.

Referring now to FIG. 3a, there is shown more precise graphical evidence of the beneficial effects of the presently disclosed main pole design of FIG. 1b. These curves were generated using results from actual spin-stand testing of the prior-art shaped pole (denoted "Normal MP Shape") and the presently disclosed shape (denoted "New MP Shape"). The curves plot EWAC vs BER, where EWAC stands for erasure width of the AC pattern (equivalent to the magnetic write width) and BER stands for bit-error-rate along the recording track. In FIG. 3a, it is shown that the presently disclosed design is just as effective for on-track writing as the prior-art design of FIG. 1a.

Figure 3B:
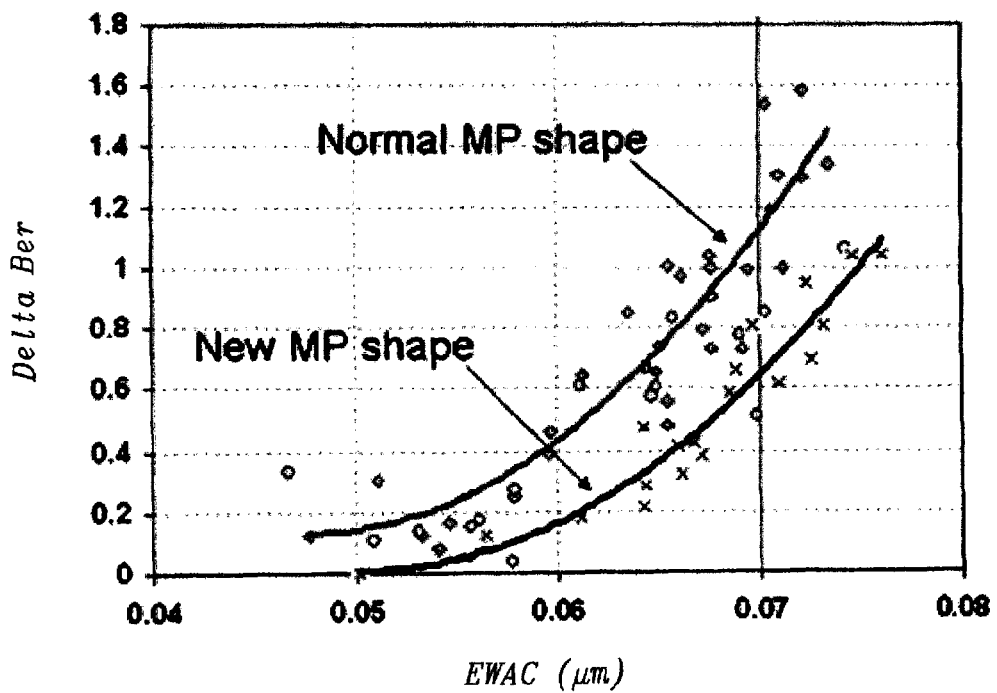
FIG. 3b is a graphical illustration of the adjacent-track performance (ATI) of a prior art writer with the pole design shown in FIG. 1a, compared to the adjacent-track performance, under identical circumstances, of the presently disclosed pole design of FIG. 1b.

In FIG. 3b, there are shown two curves, fitting a collection of data points. These curves plot the off-track performance for the "New MP Shape" (FIG. 1b) and the "Normal MP Shape" (FIG. 1a). There is a distinct improvement in off-track performance of the presently disclosed pole (FIG. 1b) as compared to the prior-art design (FIG. 1a).

The relevant dimensions of the presently disclosed pole that produce the results indicated in FIG. 3b, are as follows.

The horizontal width of the bar feature, bar_width, is between approximately 1 and 20 microns. The vertical height of the bar feature, bar_height, is between approximately 0.2 and 3 microns. The vertical distance between the bar edge and the ABS, d_ABS, is between approximately 0.3 and 3 microns. It is to be noted that the purpose of the bar-shaped feature is to dilute the concentration of magnetization that occurs towards the pole tip and that causes the unwanted flux leakage from the side shields. This is accomplished by the shape anisotropy introduced into the pole shape by the laterally extended bar. Other shapes are also possible if they produce the required anisotropy in the main pole shape. For example, spherical, elliptical, triangular or dumbbell shaped extensions could also supply the shape anisotropy that would improve the ATI performance without degrading on-track performance.

The magnetic pole of FIG. 1b can be easily fabricated if the extended bar element is formed as an integral part of the pole itself. In that case, the mask used to define the main pole shape is simply modified to include the laterally extending projections of the included bar element or a laterally extending element of whatever shape is desired so long as it provides sufficient shape anisotropy to diffuse the concentrated flux at the pole tip.

Two possible fabrication types are considered, corresponding to two possibilities for the structure of the bar. In one type, the bar is an inclusion of a different magnetic material than that forming the main pole and it passes through the main pole and extends horizontally and symmetrically from its sides. This bar will produce the desired magnetic effects both as a result of its shape and its different intrinsic magnetic properties.

In a second type of fabrication, the bar is formed of the same material as the main pole, so its contribution to magnetic anisotropy is almost entirely a result of its extensions from the sides of the main pole and not from any perturbation to the magnetic material of the interior of the pole. In this case, the bar is more properly considered to be an extension from both sides of the pole, rather than an element that passes through the pole.

In the second type of fabrication, where the bar is formed of the same material as the main pole, the effectiveness of the bar can be assessed in terms of its aspect ratio, R, which is the ratio of the width of the bar (its length in a horizontal direction) that extends beyond the pole, divided by the height of the bar (in a direction perpendicular to the ABS), bar_height. Preferably, this ratio should be greater than approximately 3: R>approx. 3.

In the exemplary main pole used to generate the empirical data for FIGS. 3a, b, the total width of the bar, bar_width, is 12 microns (μm), the bar_height is 0.8 μm, and the distance between the bottom edge of the bar and the ABS, dABS, is 1 μm. From the geometry of the main pole triangular periphery, the bar extends beyond the main pole by approximately 5.4 μm and its aspect ratio, R=6.75.

Two methods can be used to fabricate the main magnetic pole and bar combination when they are of different material. We assume the bar is formed of material A, having saturation magnetization $M_sA$, whereas the pole is formed of material B, having saturation magnetization $M_sB$.

Figure 4A:
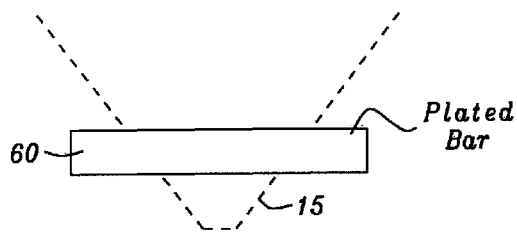
FIGS. 4a and 4b shows a method of forming the main magnetic pole where the transverse bar is first plated and the pole is plated over the bar.
Figure 4B:
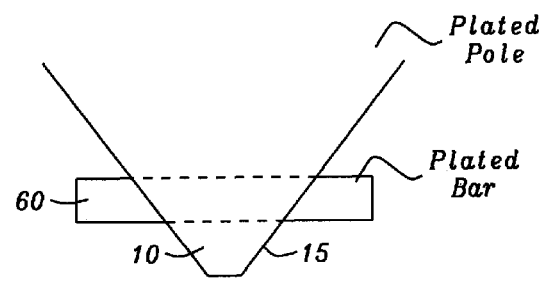

Method 1: Referring to FIG. 4a, there is shown a plated bar (60) formed in a horizontal trench having the shape of the transverse bar, a pole shaped peripheral form (15) is shown in dashed lines about the trench. Plate the bar first, in the desired bar-shaped trench, using material A. Referring next to FIG. 4b, then plate the main pole (10) with material B, filling in the properly shaped triangular form, on top of the bar, thereby incorporating the bar within the body of the main pole.

Finally, polish the plated configuration using CMP. The result is the main pole body containing the bar shape with a controllable thickness due to its separate plating process.

Figure 5A:
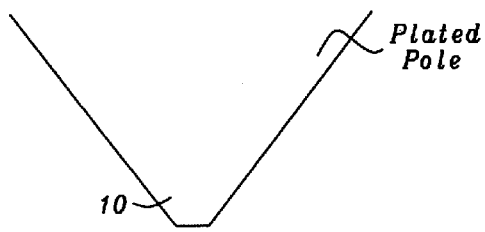
FIGS. 5a and 5b shows a method of forming the main magnetic pole where a pole is first plated and the bar is then plated in a trench formed in the already plated pole.
Figure 5B:
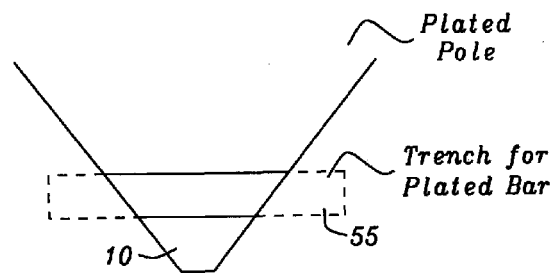

Method 2: Referring to FIG. 5a, plate the main pole (10) first, using material B, and with the desired triangular shape as given by a plating form (not shown). Referring to FIG. 5b, then, form a bar-shaped trench (55) in the already plated main pole and extending properly beyond the pole periphery (dashed lines) and fill the trench with material A so that it extends beyond the periphery of the main pole. Finally, polish using CMP.

As is finally understood by a person skilled in the art, the detailed description given above is illustrative of the present disclosure rather than limiting of the present disclosure. Revisions and modifications may be made to methods, materials, structures and dimensions employed in forming and providing a magnetic main pole having a symmetric bar-like lateral extension beyond the pole periphery to introduce a shape anisotropy that dilutes the magnetic flux at an ABS end, while still forming and providing such a structure in accord with the spirit and scope of the present disclosure as defined by the appended claims.

What is claimed is:

1. A magnetic writer comprising:
   A main pole tapering to a narrow pole tip at an air bearing surface (ABS);
   A pair of side shields, mirror-symmetrically disposed to either side of said pole tip, wherein each of said pair of side shields has a face that is coplanar with said ABS and surrounding said pole tip;
   wherein said side shields are separated from said pole tip by a gap;
   wherein a horizontal cross-section of said main pole has a peripheral shape that is symmetric about a centerline, triangular and tapering towards said ABS;
   wherein said periphery is interrupted by two projections that extend horizontally, co-linearly and symmetrically from said periphery;
   wherein said projections have an aspect ratio, R, which is the ratio of the horizontal length of said projection, divided by the height of said projection in a direction perpendicular to said ABS;
   wherein said horizontally co-linear projections are substantially parallel to said ABS and wherein said projections are positioned at a perpendicular distance, denoted d_ABS, from said ABS.

2. The magnetic writer of claim 1 wherein said horizontally co-linear projections are formed of the same material as said main pole and are shaped as bars, spheres or ellipsoids.

3. The magnetic writer of claim 1 wherein said horizontally co-linear projections provide said main pole with a magnetic anisotropy when said main pole is activated by a write current.

4. The magnetic writer of claim 3 wherein said shape asymmetry reduces the concentration of magnetic flux emerging from said pole tip.

5. The magnetic writer of claim 1 wherein opposite lateral edges of said co-linear projections are separated by an amount denoted Bar_width that is between approximately 1 and 20 microns.

6. The magnetic writer of claim 1 wherein opposite vertical edges of said co-linear projections are separated by an amount denoted Bar_height between approximately 0.2 and 3 microns.

7. The magnetic writer of claim 1 wherein d_ABS is between approximately 0.3 and 3 microns.

8. The magnetic writer of claim 1 wherein R is greater than approximately 3.

9. The magnetic writer of claim 1, wherein bar_width, is approximately 12 μm, bar_height is approximately 0.8 μm, and d_ABS, is approximately 1 μm.

10. The magnetic writer of claim 1 wherein said periphery has a triangular shape with a vertex angle between approximately 30° and 120°.

11. A magnetic writer comprising:
    A main pole tapering to a narrow pole tip at an air bearing surface (ABS);
    A pair of side shields, mirror-symmetrically disposed to either side of said pole tip, wherein each of said pair of side shields has a face that is coplanar with said ABS and surrounding said pole tip;
    wherein said side shields are separated from said pole tip by a gap;
    wherein a peripheral shape of a horizontal cross-section of said main pole is a triangle, symmetric about a centerline, tapering towards said ABS, interrupted by two symmetrical, horizontally co-linear projections that extend from each lateral side beyond said triangular periphery;
    wherein a bar-shaped element passes horizontally completely through said main pole, parallel to said ABS, thereby creating said horizontally co-linear projections;
    wherein said bar-shaped element is positioned at a perpendicular distance, denoted d_ABS, from said ABS.

12. The magnetic writer of claim 11 wherein said bar-shaped element is formed of a soft magnetic material having a different saturation magnetization, $m_s$, than that of the main pole material, whereby said bar-shaped element provides said magnetic pole with a magnetic anisotropy to lessen a flux concentration at said pole tip when activated by a write current.

13. The magnetic writer of claim 11 wherein said bar-shaped element is formed of a hard magnetic material having a magnetic anisotropy that will lessen the concentration of magnetization at said pole tip when said main pole is activated by a write current.

14. The magnetic writer of claim 11 wherein said bar-shaped element is spherical, ellipsoidal, triangular or dumbbell-shaped.

15. The magnetic writer of claim 11 wherein opposite lateral edges of said bar-shaped element are separated by an amount denoted Bar_width that is between approximately 1 and 20 microns.

16. The magnetic writer of claim 11 wherein opposite vertical edges of said bar-shaped element are separated by an amount denoted Bar_height between approximately 0.2 and 3 microns.

17. The magnetic writer of claim 11 wherein d_ABS is between approximately 0.3 and 3 microns.

18. The magnetic writer of claim 11 wherein said periphery has a triangular shape with a vertex angle between approximately 30° and 120°.

19. A method of forming a magnetic writer, comprising:
    forming a main magnetic pole having a substantially triangular horizontal cross-sectional periphery that is symmetric about a centerline and that tapers towards an ABS at which point it forms a pole tip; then
    forming a horizontal bar-shaped element within said main magnetic pole, transverse to said centerline and at a distance d_ABS above said ABS;
    wherein said horizontal bar projects symmetrically beyond said periphery; then forming a pair of side shields along said ABS, wherein said side shields are laterally and symmetrically disposed to either side of said pole tip.

20. The method of claim 19 wherein said main magnetic pole is formed by a plating process comprising:

providing a horizontal trench for plating said bar-shaped element and plating said bar-shaped element therein;

plating said main magnetic pole over said bar-shaped element, thereby including said bar-shaped element within said main magnetic pole;

Using a CMP process, smoothing said plated magnetic pole and bar-shaped element included therein.

21. The method of claim 19 wherein said main pole is formed by a plating process comprising:

forming a plated main magnetic pole;

forming a horizontal trench in said plated main magnetic pole;

plating said bar-shaped element in said horizontal trench;

using a CMP process, smoothing said plated magnetic pole and bar-shaped element.

22. The method of claim 19 wherein said bar-shaped element is formed of a soft magnetic material having a different saturation magnetization, $M_s$, than that of the main pole material.

23. The method of claim 19 wherein said bar-shaped element is formed of a hard magnetic material having an anisotropy that will lessen a concentration of magnetization at said pole tip.

24. The method of claim 19 wherein said bar-shaped element is spherical, ellipsoidal, triangular or dumbbell-shaped.

25. The method of claim 19 wherein opposite lateral edges of said co-linear projections are separated by an amount denoted Bar_width that is between approximately 1 and 20 microns.

26. The method of claim 19 wherein opposite lateral edges of said bar-shaped element are separated by an amount denoted Bar_width that is between approximately 1 and 20 microns.

27. The method of claim 19 wherein opposite vertical edges of said co-linear projections are separated by an amount denoted Bar_height between approximately 0.2 and 3 microns.

28. The method of claim 19 wherein d_ABS is between approximately 0.3 and 3 microns.

29. The method of claim 19 wherein said periphery has a triangular shape with a vertex angle between approximately 30° and 120°.

30. A method of forming a magnetic writer, comprising:

forming a main magnetic pole having a substantially triangular horizontal cross-sectional periphery that is symmetric about a centerline and that tapers towards an ABS at which point it forms a pole tip;

wherein a horizontal cross-section of said main magnetic pole has a peripheral shape that is a triangle tapering towards said ABS, interrupted a distance d_ABS above said ABS, by two horizontally co-linear projections that extend laterally and symmetrically from each lateral side beyond said triangular periphery;

wherein each of said projections have an aspect ratio, R, which is the ratio of the horizontal length of said projection, divided by the height of said projection in a direction perpendicular to said ABS;

forming a pair of side shields along said ABS, wherein said side shields are laterally and symmetrically disposed to either side of said pole tip.

31. The method of claim 30 wherein opposite vertical edges of said co-linear projections are separated by an amount denoted Bar_height between approximately 0.2 and 3 microns.

32. The method of claim 30 wherein d_ABS is between approximately 0.3 and 3 microns.

33. The method of claim 30 wherein R is greater than 3.

34. The method of claim 30 wherein said periphery has a triangular shape with a vertex angle between approximately 30° and 120°.

\* \* \* \* \*